United States Patent
Savvopoulos et al.

(10) Patent No.: US 9,234,763 B1
(45) Date of Patent: Jan. 12, 2016

(54) SYSTEMS AND METHODS FOR IDENTIFYING AND SELECTING PERSONALIZED WAYPOINTS FOR PRESENTATION ON A MAP

(71) Applicant: Google Inc., Mountain View, CA (US)

(72) Inventors: Christos Savvopoulos, Zurich (CH); Stephan Seyboth, Zurich (CH)

(73) Assignee: Google Inc., Mountain View, CA (US)

( * ) Notice: Subject to any disclaimer, the term of this patent is extended or adjusted under 35 U.S.C. 154(b) by 56 days.

(21) Appl. No.: 13/966,424

(22) Filed: Aug. 14, 2013

(51) Int. Cl.
 *G01C 21/00* (2006.01)
 *G01C 21/34* (2006.01)
(52) U.S. Cl.
 CPC .................................. *G01C 21/3484* (2013.01)
(58) Field of Classification Search
 CPC ........... G01C 21/3484; G01C 21/3679; G01C 21/3682; G01C 21/36
 See application file for complete search history.

(56) References Cited

U.S. PATENT DOCUMENTS

| | | | |
|---|---|---|---|
| 7,593,740 B2 | 9/2009 | Crowley et al. | |
| 8,352,303 B2 | 1/2013 | Lehmann et al. | |
| 2009/0006994 A1 | 1/2009 | Forstall et al. | |
| 2009/0031006 A1* | 1/2009 | Johnson | H04W 4/025 709/218 |
| 2011/0046881 A1 | 2/2011 | Karaoguz | |
| 2011/0227699 A1 | 9/2011 | Seth et al. | |
| 2011/0313657 A1* | 12/2011 | Myllymaki | G01C 21/3682 701/438 |
| 2012/0030578 A1 | 2/2012 | Athsani et al. | |
| 2012/0053829 A1* | 3/2012 | Agarwal et al. | 701/418 |
| 2012/0271541 A1 | 10/2012 | Hjelm et al. | |
| 2012/0271676 A1 | 10/2012 | Aravamudan et al. | |
| 2012/0303570 A1 | 11/2012 | Stevens, III | |
| 2013/0238241 A1 | 9/2013 | Chelotti et al. | |
| 2014/0074395 A1* | 3/2014 | Brown | 701/424 |

\* cited by examiner

*Primary Examiner* — Jonathan M Dager
(74) *Attorney, Agent, or Firm* — Dority & Manning, P.A.

(57) ABSTRACT

Systems and methods for identifying and selecting personalized waypoints for presentation on a map are provided. In particular, a user's data can be analyzed to identify a plurality of candidate waypoints. The candidate waypoints can correspond to locations at which the user has a scheduled event, reservation, or appointment. When the user performs a search query in a mapping application or geographic information system, the plurality of candidate waypoints can be obtained and scored according to a scoring formula. One or more candidate waypoints can be selected based on the determined scores and presented on a personalized map in addition to the result of the search query. An exemplary scoring formula takes a candidate waypoint and a point of interest search result as inputs and analyzes a distance between the two locations and a likelihood that a user wants directions between the two locations.

16 Claims, 3 Drawing Sheets

SYSTEMS AND METHODS FOR IDENTIFYING AND SELECTING PERSONALIZED WAYPOINTS FOR PRESENTATION ON A MAP

FIELD

The present disclosure relates generally to providing a personalized map. In particular, the present disclosure relates to systems and methods for identifying and selecting personalized waypoints for presentation on a map.

BACKGROUND

A client device such as a smartphone or a desktop computer can operate a browser, mapping application, or a geographic information system to provide maps and/or other geographic imagery and data to a user. For example, a user can request a map or driving directions to a particular address. As another example, a map can be provided in response to a web search query that implicitly calls for geographic results, such as when the search includes the name of a business having a physical location. Generally, the client device can communicate with a host server over a network in order to obtain the appropriate geographic information to provide to the user.

One particular instance in which mapping applications or other means for obtaining geographic information are particularly useful is when a user is exploring an area with which the user is relatively unfamiliar. For example, the user can be on vacation, work travel, or simply in an unfamiliar location within their home city. As a result, the user can use a mapping application to navigate about the area of exploration and receive other useful geographic information.

However, for a user who has multiple events planned in the area of exploration (e.g. arrive at the airport, check into the hotel, attend a meeting a first location, meet with friends at a second location, attend a sporting event at a third location), navigating among such events can be a difficult task. In particular, traditional operation of a mapping application can require the user to determine the location of each expected event relative to the locations of the other expected events on an individualized basis.

For example, the user may land at the destination airport and perform a search for the location of the hotel. The user would then be required to perform a second search to determine the first location at which she is expecting to attend the meeting, perform a third search to determine the second location at which she is expecting to meet with friends, and so on. Thus, when a user is unfamiliar with a particular area, synthesizing the results of two or more searches can be a difficult task, causing the user to be unsure of where each of the locations is relative to the others.

SUMMARY

Aspects and advantages of the invention will be set forth in part in the following description, or may be obvious from the description, or may be learned through practice of the invention.

One aspect of the present disclosure is directed to a host server for providing geographic information. The host server is configured to perform operations. The operations include receiving a search query from a client device. The client device has been associated with a user account. The operations include, in response to the received search query, identifying a point of interest. The operations include obtaining a plurality of candidate waypoints from a database. Each of the candidate waypoints has been identified by analyzing data associated with the user account. The operations include determining a score for each of the candidate waypoints using a scoring formula and selecting at least one of the candidate waypoints for presentation on a map displaying the point of interest.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for identifying and selecting personalized waypoints for presentation on a map in conjunction with a search result. In particular, a user's data, such as email data or calendar data, can be analyzed to identify a plurality of candidate waypoints. The candidate waypoints can correspond to locations at which the user has a scheduled event, reservation, or appointment. When the user performs a search query in a mapping application or geographic information system, the plurality of candidate waypoints can be obtained and scored according to a scoring formula. One or more candidate waypoints can be selected based on the determined scores and presented on a personalized map in addition to the result of the search query.

More particularly, if a user has chosen to participate and provided consent after being informed of what data is collected and how such data is used, data associated with a variety of services engaged in by such user can be analyzed to identify the plurality of candidate waypoints. In particular, the identified candidate waypoints can correspond to locations at which a user has a scheduled event, reservation, or appointment (i.e. a location that the user is generally expecting to visit or has recently visited). As an example, the user's emails can be parsed or compared to templates in order to identify the candidate waypoints. As another example, the user's entries in a calendar application can be analyzed to identify the candidate waypoints.

In some implementations, the process of identifying candidate waypoints is device-agnostic and is based on a user account associated with the user. In particular, the plurality of candidate waypoints can be identified and stored in a database keyed by user account. Further, in some implementations, each identified candidate waypoint is assigned to a category. Exemplary categories include a hotel category, an airport category, a restaurant category, and a transit station category.

The user can perform a search query in a mapping application or geographic information system using a client device that is signed into her user account. In particular, the search query can specify one or more criteria or identify a desired location. The search query can be sent from the client device to a host server over a network.

In response to the search query, the host server can identify a point of interest. The identified point of interest can be an optimal result given the search query as input. The host server can also recognize that the client device is signed into or otherwise associated with the user account and can obtain from the database the plurality of candidate waypoints associated with such user account.

The host server can determine a score for each of the candidate waypoints using a scoring formula. In particular, the scoring formula can receive the candidate waypoint being scored and the point of interest search result as inputs. As an example, the scoring formula can determine the score for each candidate waypoint based at least in part on a distance between the candidate waypoint and the point of interest and a likelihood that the user desires directions between the candidate waypoint and the point of interest.

The distance between the candidate waypoint and the point of interest can equal a linear distance between the two locations (i.e. "as the crow flies"), a driving distance between the two locations according to a routing, or a duration of travel between the two locations according to a variety of travel methods.

In some implementations, scoring a candidate waypoint can include determining a first distance scaling component, determining a second distance scaling component, and/or determining a suitability component. For example, the score can be the sum of such components.

The first distance scaling component can scale the distance between the candidate waypoint being scored and the point of interest based on a first category assigned to the candidate waypoint. As an example, the first distance scaling component can equal a first weighted distance divided by the distance between the candidate waypoint and the point of interest. The first weighted distance can provide a number based on the first category. The number can be in units of distance.

The second distance scaling component can scale the distance between the candidate waypoint being scored and the point of interest based on a second category assigned to the point of interest. For example, the second distance scaling component can equal a second weighted distance divided by the distance between the candidate waypoint and the point of interest. The second weighted distance can provide a number based on the second category. The number can be in units of distance.

The suitability component can provide a value indicative of a likelihood that the user desires directions between the location and the point of interest based on the first category assigned to the candidate waypoint being scored and the second category assigned to the point of interest. For example, the suitability component can reference a look-up table that provides a suitability score for each potential combination of the first and second categories. The suitability component can also include a weighting coefficient.

In addition, other parameters can be included or analyzed by a suitable scoring formula. As an example, the current position of the client device can influence one or more components or aspects of the scoring formula. As another example, in some implementations, a time can be associated with some or all of the candidate waypoints and the scoring formula can include a component that analyzes a difference between a current time and the time associated with the candidate waypoint being scored.

After each of the candidate waypoints has been provided a score, one or more of the candidate waypoints can be selected for presentation on a personalized map alongside the point of interest. For example, the two candidate waypoints that receive the highest scores can be selected. The host server can transmit mapping data to the client device and the client device can use such mapping data to present the personalized map to the user.

The client device can present the personalized map on a display. The respective locations of the point of interest and the selected waypoints can be indicated using any suitable form of indicator. Textual information can be provided such as names, reviews, keywords or an estimated trip duration can be provided for one or more forms of transportation. The user can be given the option of selecting and subsequently receiving directions to or from each presented waypoint and the point of interest or such directions can be overlaid on the map in a faded fashion.

In such fashion, when a user searches for a point of interest the resulting map can provide additional personalized waypoints that represent locations at which an event is expected to occur (e.g. a sporting event for which the user has purchased tickets) or locations that may be helpful for a user who is in an unfamiliar area (e.g. the location of the hotel at which she is staying or the airport from which she is departing).

Importantly, in situations in which the systems and method discussed herein collect information about a user, such as position data, email data, or other user data, the user can be provided with an opportunity to control whether programs or features collect such information. In particular, such information is not collected or used unless the user provides consent after being informed of what data is collected and how such data is used. Further, the user can be provided with a tool to revoke or modify the scope of permissions. In addition, certain information or data can be treated in or more ways before it is stored or used, so that personally identifiable information is removed or stored in an encrypted fashion.

Figure 1:
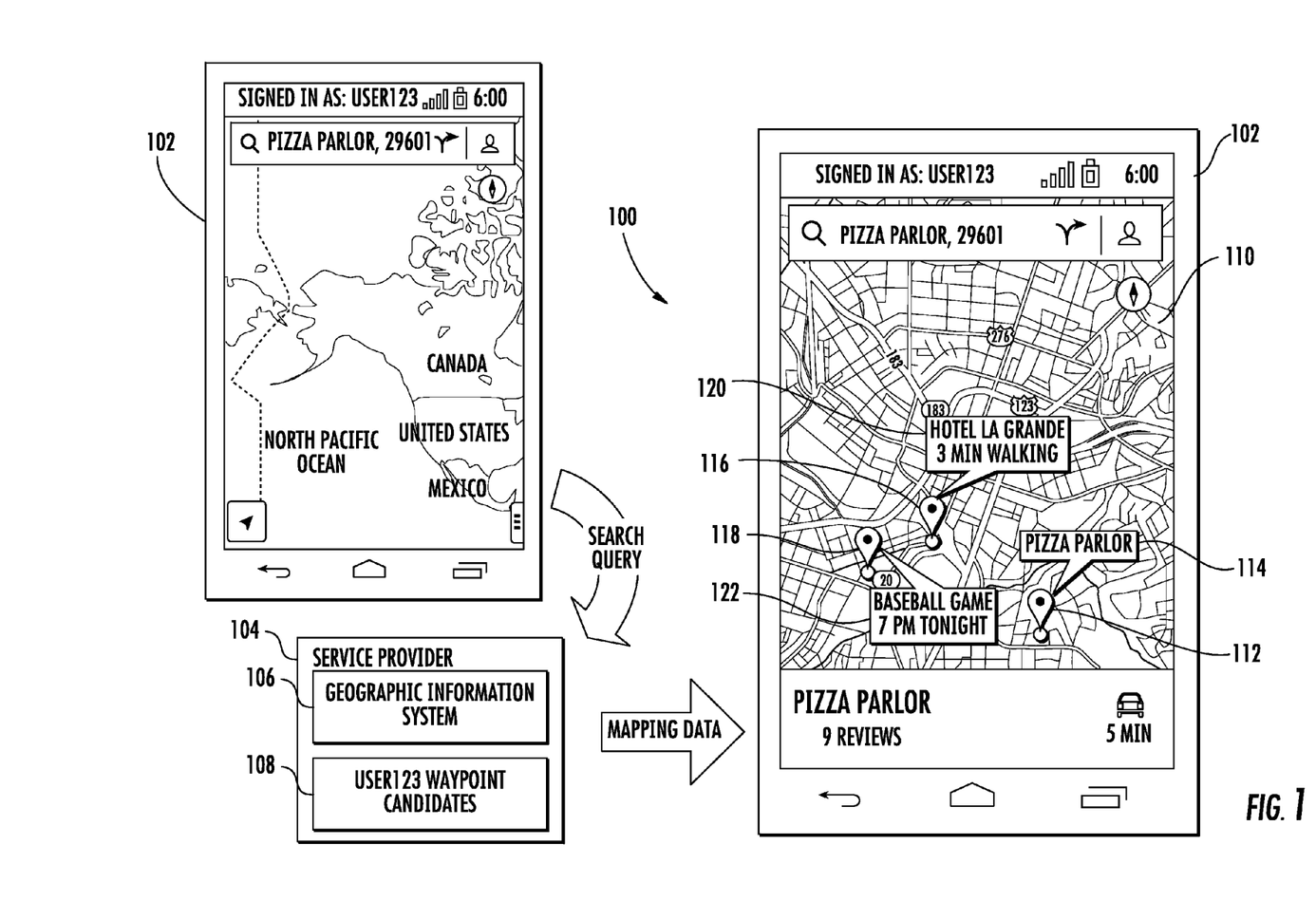
FIG. 1 depicts a graphical representation of a client device requesting and receiving geographic information from a service provider according to an exemplary embodiment of the present disclosure.

With reference now to the FIGS., exemplary embodiments of the present disclosure will now be discussed in detail. FIG. 1 depicts a graphical representation 100 of a client device 102 requesting and receiving geographic information from a service provider 104 according to an exemplary embodiment of the present disclosure. The exemplary embodiment shown in FIG. 1 is provided solely for the purposes of illustrating and explaining exemplary aspects of the present disclosure and does not limit the present disclosure in any fashion.

As shown in FIG. 1, exemplary client device 102 can implement a mapping application to access geographic information including maps, point of interest locations, and other features. For example, client device 102 can implement computer-readable instructions stored in a local memory in order to operate the mapping application. As another example, client device 102 can operate a web-browser to visit a specified website providing the mapping application as a service over the Internet.

Further, it can be seen that client device 102 has been used to sign into a user account ("User123"). As used herein, a user account can be any account or means of identification that is associated with a user. Exemplary user accounts include an operating system account; an account used for purchasing and ownership of content from a content distribution platform; a web-based email account; a social media account; a financial services account; a game account; an application-specific account (e.g. a news aggregator account or an internet-radio application account); or any other suitable user account.

In one implementation, a service provider offers several of the services discussed above (e.g. web-based email, social media, gaming, and content distribution) and a single user account can be used to participate in, receive, or otherwise control aspects of each of such services from the service provider.

As an example, as shown in FIG. 1, the user has entered a point of interest search query of "Pizza Parlor, 29601." By pressing or selecting an "Enter" key, a "Go" icon, or the magnifying glass icon the user can send the search query to a service provider 104.

Service provider 104 can analyze the received search query to identify a point of interest according to any suitable identification technique. In particular, service provider 104 can access or otherwise interact with a geographic information system 106 to identify an appropriate point of interest to return as a search result. As used herein, a "point of interest" refers to any feature, landmark, point of interest, or other object, place, or event associated with a geographic location. For instance, a point of interest can include a business, restaurant, retail outlet, coffee shop, bar, music venue, attraction, museum, theme park, arena, stadium, festival, organization, entity, municipality, locality, city, state, or other suitable points of interest.

Furthermore, according to an aspect of the present disclosure, service provider 104 can also access a plurality of candidate waypoints 108 associated with user account 'User123'. Each of the plurality of candidate waypoints 108 can include a location at which an event is scheduled or expected to occur or which the user is expecting to visit. In particular, as will be discussed further later, each of the candidate waypoints 108 can have been identified by analyzing data associated with user account 'User123'.

Service provider 104 can determine a score for each of the obtained candidate waypoints. For example, as will be discussed further later, a scoring formula can be used to provide the score for each candidate waypoint. Based on the determined scores, one or more of the candidate waypoints can be selected for presentation alongside the identified point of interest search result.

Service provider 104 can then transmit mapping data back to the client device 102. The mapping data can include data sufficient for client device 102 to render or display a personalized map 110 and any other desired visual indications or interactive features. In particular, map 110 can include an indicator 112 showing the location of the point of interest search result. A callout 114 or other text feature can identify the point of interest and provide additional information such as pricing, reviews, travel time, contact information, etc.

Furthermore, according to an aspect of the present disclosure, map 110 can also include indicators 116 and 118 respectively showing the locations of the selected waypoints. Callouts 120 and 122 or other textual features can identify the indicated waypoints and provide additional information such as distance, travel duration, the availability of directions, identification of an event, reservation, or appointment associated with such waypoint, or other features.

Any of the features provided in map 110 can be interactive such that pressing, clicking, or selecting such feature results in additional functionality. For example, in one implementation, selection of callout 120 or 122 or indicator 116 or 118 provides directions from a current location of client device 102 to the location of the waypoint, directions from the waypoint to the point of interest, or directions from the point of interest to the selected waypoint. In another implementation, selection of callout 120 or 122 or indicator 116 or 118 can result in client device 102 displaying a card or other feature that provides additional resources or information about an event that is scheduled to occur at the selected waypoint.

As an example of aspects of the present disclosure, assume that the user has previously purchased tickets to a baseball game occurring at a baseball field located at indicator 118. As a result of the purchase, the user received a confirmation email in a web-based email account associated with user account User123. The confirmation email provided electronic tickets and confirmed the time and location of the baseball game. As a result of the email, the baseball field was identified as a candidate waypoint for User123 and stored in memory. Additional information such as the time, location, and category of the event can have been stored as well.

Then, when the user searches for the "Pizza Parlor" using client device 102 signed into user account User123, the baseball field is obtained and scored as a candidate waypoint. The baseball field can then have received a sufficient score to be included as a personalized waypoint and displayed on map 110 in accordance with the present disclosure. If the user presses, clicks, or otherwise selects indicator 118, client device 102 can provide additional information about the baseball game scheduled at the baseball field or can access User123's web-email and present the electronic tickets.

In such fashion, a mapping system configured in accordance with the present disclosure can display one or more personalized waypoints on a map and provide a seamless gateway to navigating among personalized places, events, and useful information.

Figure 2:
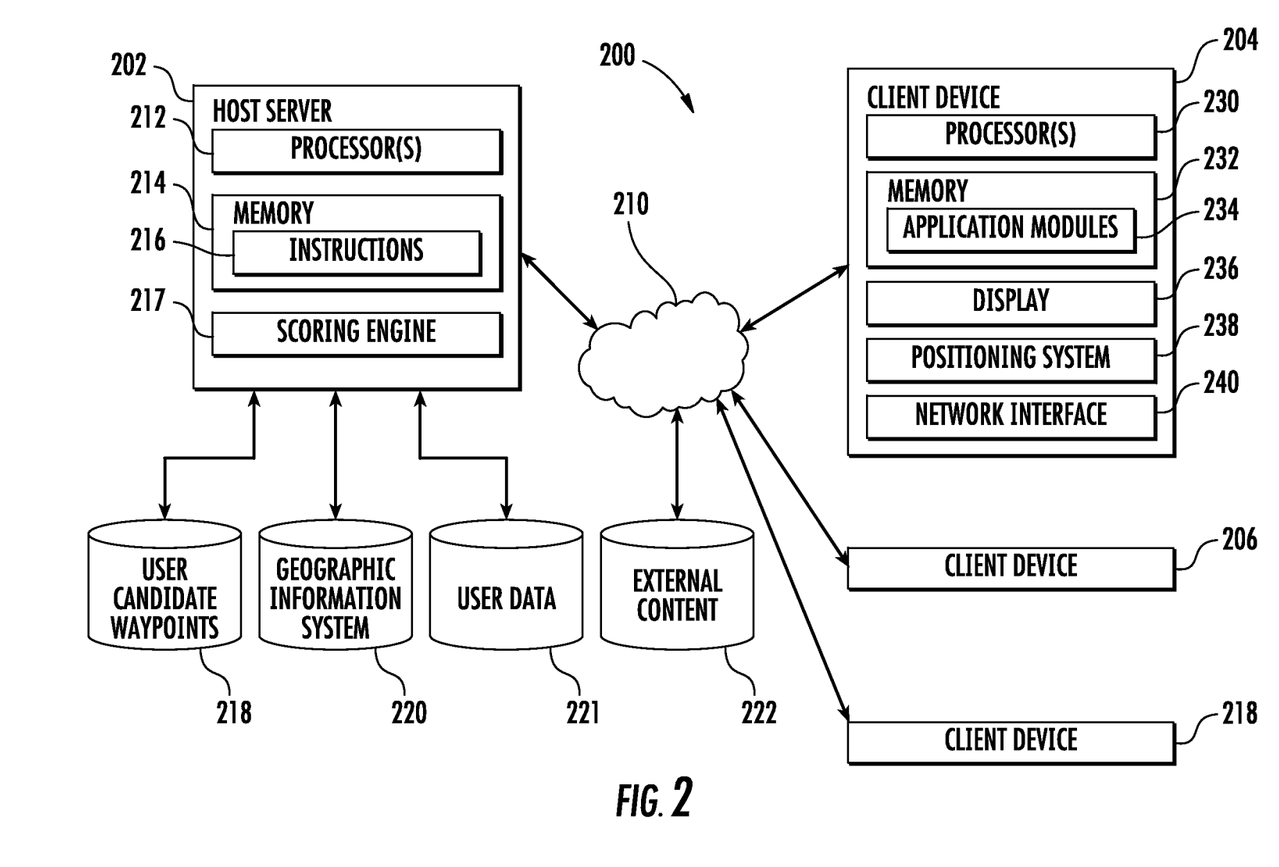
FIG. 2 depicts an exemplary system according to an exemplary embodiment of the present disclosure.

FIG. 2 depicts an exemplary system 200 according to an exemplary embodiment of the present disclosure. System 200 can include a client-server architecture, where a host server 202 communicates with one or more client devices 204, 206, and 208 over a network 210. Although three client devices 204, 206, and 208 are illustrated in FIG. 2, any number of client devices can be connected to host server 202 over network 210.

Client devices 204, 206, and 208 can be, for example, a computing device having a processor 230 and a memory 232, such as a wireless mobile device, a personal digital assistant (PDA), smartphone, tablet, navigation system located in a vehicle, handheld GPS system, laptop computer, desktop computer, computing-enabled watch, computing-enabled eyeglasses, gaming console, embedded computing system, or other such devices/systems. In short, client device 204 can be any computer, device, or system that can interact with the host server system 202 (sending and receiving data) to implement the present disclosure.

Processor 230 of client device 204 can be any suitable processing device and can be one processor or a plurality of processors that are operably connected. Memory 232 can include any number of computer-readable instructions or other stored data. In particular, memory 232 can include, store, or provide one or more application modules 234. When implemented by processor 230, application modules 234 can respectively cause or instruct processor 230 to perform operations consistent with the present disclosure, such as, for example, running a mapping application or a browser application in order to obtain and display personalized maps. Other modules can include a virtual wallet application module, a web-based email module, a game application module, or other suitable application modules.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example, computer executable instructions that are stored in a tangible computer-readable storage medium such as RAM hard disk or optical or magnetic media.

Client device 204 can further include a positioning system 238. Positioning system 238 can determine a current geographic location of client device 204 and communicate such geographic location to host server 202 over network 210. The positioning system 238 can be any device or circuitry for analyzing the position of the client device 204. For example, the positioning system 238 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

In the instance in which the user consents to the use of positional or location data, the positioning system 238 can analyze the position of the client device 204 as the user moves around in the world and provides the current location of client device 204 to the host server 202 over network 210. The current location of client device 204 can be displayed on the map and can influence aspects of the present disclosure, including scores assigned to candidate waypoints or the directionality of offered directions between a waypoint and a point of interest search result.

Client device 204 can further include a network interface 240. Network interface 240 can include any suitable components for interfacing with one more networks, including for example, transmitters, receivers, ports, controllers, antennas, or other suitable components.

Host server 202 can be implemented using one or more suitable computing devices and can include a processor 212 and a memory 214. Processor 212 can be any suitable processing device and can be one processor or a plurality of processors which are operably connected. Memory 214 can store instructions 216 that cause processor 212 to perform operations to implement the present disclosure, including performing aspects of method (300) of FIG. 3.

Host server 202 can also include a scoring engine 217. Scoring engine 217 can include software and associated circuitry for determining a score for a particular candidate waypoint. For example, scoring engine 217 can compute the score for each candidate waypoint according to a scoring formula or scoring metric. Host server 202 can communicate with client device 204 over network 210 by sending and receiving data.

Network 210 can be any type of communications network, such as a local area network (e.g., intranet), wide area network (e.g., Internet), or some combination thereof and can include any number of wired or wireless links. In general, communication between the host server 202 and a client device 204 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Preferably, however, client device 204 can freely move throughout the world and communicate with host server 202 is a wireless fashion.

Figure 3:
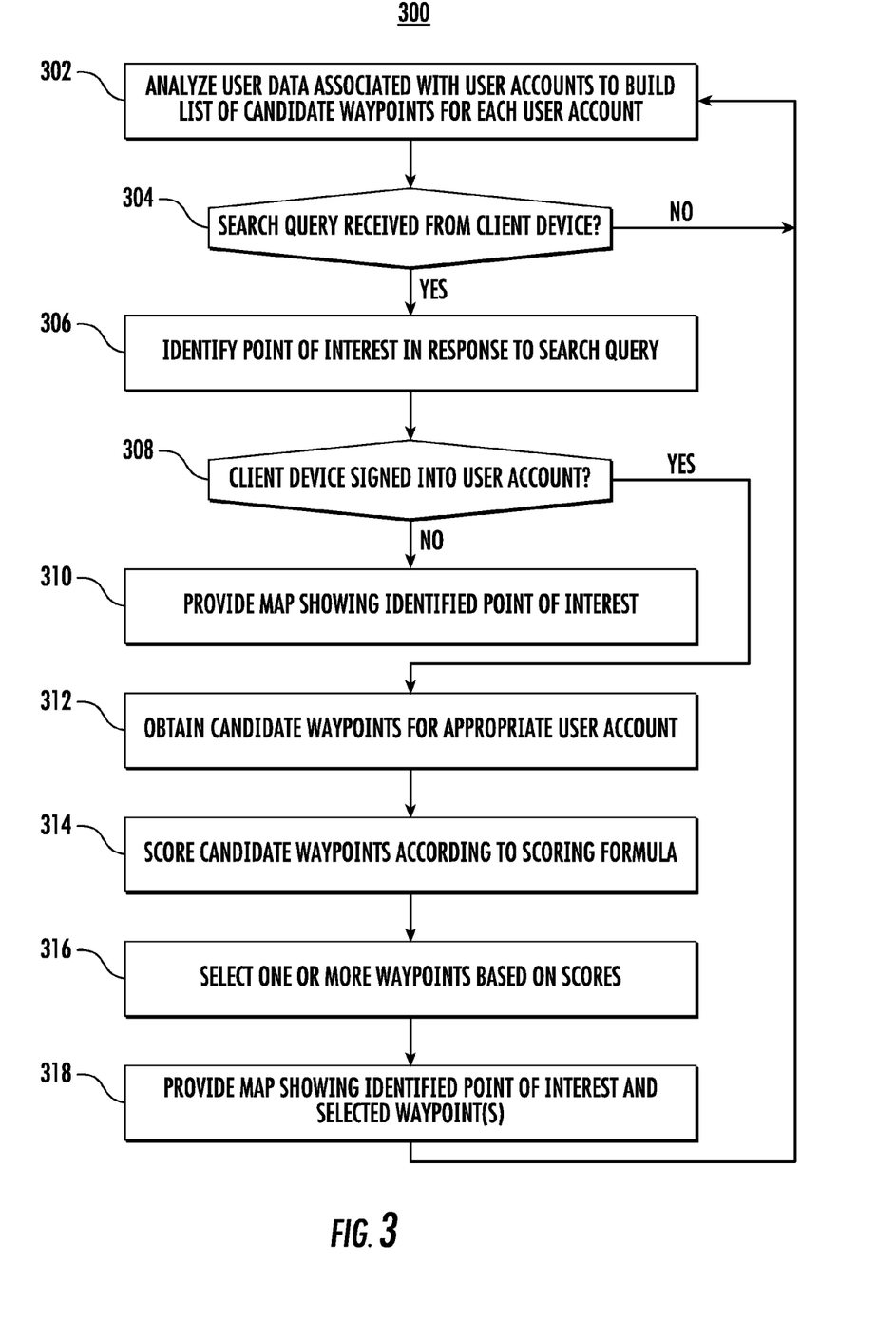
FIG. 3 depicts an exemplary method for identifying and selecting personalized waypoints for presentation on a map according to an exemplary embodiment of the present disclosure.

Host server 202 can be coupled to or in communication with one or more databases, including a database providing an index of user candidate waypoints 218, a geographic information system 220, user data 221, and external content 222. Although databases 218, 220, 221, and 222 are depicted in FIG. 3 as external to host server 202, one or more of such databases can be included in memory 214 of host server 202. Further, databases 218, 220, 221, and 222 can each correspond to a plurality of databases rather than a single data source.

According to an aspect of the present disclosure, user candidate waypoints database 218 can store or provide a plurality of candidate waypoints for each of a plurality of user accounts. For example, after being informed of what data is collected, how it is collected, and how such data is used, a user having a user account can elect to participate in the system of the present disclosure.

In order to identify the plurality of candidate waypoints stored in database 218, host server (or another associated computing device) can analyze user data 221. User data 221 can include, but is not limited to, email data including textual content, images, email-associated calendar information, or contact information; social media data including comments, reviews, check-ins, likes, invitations, contacts, or reservations; calendar application data including dates, times, events, description, or other content; virtual wallet data including purchases, electronic tickets, coupons, or deals; game application data, including location-based game data; scheduling data; location data; SMS data; or any other suitable data associated with a user account. Generally such data is analyzed to determine locations which the user is expecting to visit or has recently visited and which have generally elevated importance.

Importantly, the above provided examples of user data 221 are simply provided for the purposes of illustrating potential data that could be analyzed to identify candidate waypoints in some embodiments. However, such user data is not collected, used, or analyzed unless the user has provided affirmative consent after being informed of what data is collected and how such data is used. Further, the user can be provided with a tool to revoke or modify the scope of permissions. In addition, certain information or data can be treated in or more ways before it is stored or used, so that personally identifiable information is removed or stored in an encrypted fashion.

Geographic information system 220 can store or provide geospatial data to be used by host server 202. Exemplary geospatial data includes geographic imagery (e.g., digital maps, satellite images, aerial photographs, street-level photographs, synthetic models, etc.), tables, vector data (e.g. vector representations of roads, parcels, buildings, etc.), point of interest data, or other suitable geospatial data. Geographic information system 220 can be used by host server 202 to provide navigational directions, perform point of interest searches, provide point of interest location or categorization data, determine distances, routes, or travel times between locations, or any other suitable use or task required or beneficial for providing the personalized map according to the present disclosure.

Computer-based system 200 can further include external content 222. External content 222 can be any form of external content including news articles, webpages, video files, audio files, written descriptions, ratings, game content, social media content, photographs, commercial offers, or other suitable external content. Host server system 202 and client device 204 can access external content 222 over network 210. External content 222 can be searched by host server 202 according to known searching methods and can be ranked according to relevance, popularity, or other suitable attributes, including location-specific filtering or promotion.

FIG. 3 depicts a flowchart of an exemplary method (300) for identifying and selecting personalized waypoints for presentation on a map according to an exemplary embodiment of the present disclosure. While exemplary method (300) will be discussed with reference to the system 200 of FIG. 2, method (300) can be implemented using any suitable computing system.

In addition, although FIG. 3 depicts steps performed in a particular order for purposes of illustration and discussion, methods of the present disclosure are not limited to such particular order or arrangement. One skilled in the art, using the disclosures provided herein, will appreciate that various steps of the method (300) can be omitted, rearranged, combined, and/or adapted in various ways without deviating from the scope of the present disclosure.

At (302) user data respectively associated with a plurality of user accounts can be analyzed to build a list of candidate waypoints for each of such user accounts. For example, host server 204 or an associated computing device can analyze user data 221 to identify the candidate waypoints for each user account. For example, user data associated with a first user account can be analyzed to build a list of candidate waypoints for the first user account. Likewise, user data associated with a second user account can be analyzed to build a list of candidate waypoints that are specific to the second user account. Thus, a personalized list of candidate waypoints can be built for each user account at (302).

In some implementations, analyzing the user data at (302) includes comparing content to a plurality of templates to identify one or more scheduled events, appointments, or reservations. For example, emails can be parsed to identify reservations at hotels or restaurants, flight reservations, sporting events, or generally any kind of event that involves a point of interest or location. As another example, user calendar data can be analyzed to identify the candidate waypoints.

The identified candidate waypoints can be stored in database 218 and keyed by user account. For example, in some implementations, each candidate waypoint can be geocoded (i.e. identified by a latitude and longitude) to provide a precise location. For example, geographic information system 220 can be used to determine the appropriate geocode for each candidate waypoint.

In other implementations, each candidate waypoint can be categorized according to its associated point of interest. Exemplary categories include, but are not limited to, an airport category, a hotel category, a residence category, a commercial office space category, a restaurant category, a pub/bar category, a transit station category (e.g. bus stop), or any other suitable category. For example, geographic information system 220 can be used to determine the appropriate category for each candidate waypoint.

At (304) it is determined whether a search query has been received from a client device. For example, host server 202 can receive a search query from client device 204 over network 210. If it is determined that a search query has not been received, then method (300) can return to (302) and continue building the list of candidate waypoints.

However, if it is determined at (304) that a user search query has been received, the method (300) can proceed to (306). At (306) a point of interest can be identified in response to the search query received at (304). For example, host server 202 can access or otherwise operate in conjunction with geographic information system 220 to identify a point of interest in response to the received search query. Any suitable technique for identifying a result based on the search string can be performed at (306).

At (308) it can be determined whether the client device is currently signed into or otherwise presently associated with a user account. For example, session cookies or other indicators can be analyzed to determine and identify a presently active user account.

If it is determined at (308) that the client device is not currently signed into a user account, then at (310) the map can be provided without personalized waypoints. More particularly, host server 202 can provide a map showing only the identified point of interest and any other information, such as the current location of the client device.

However, if it is determined at (308) that the client device is currently logged into an identifiable user account, then method (300) can proceed to (312).

At (312) a plurality of candidate waypoints can be obtained based on the user account identified at (308). For example, host server 202 can access user candidate waypoints database 218 to obtain all candidate waypoints associated with the user account identified at (308).

At (314) each of the candidate waypoints obtained at (312) can be scored according to a scoring formula. For example, host server 202 can operate scoring engine 217 to determine a score for each of the candidate waypoints. Any appropriate scoring formula or scoring metric can be used at (314).

The scoring formula can score each candidate waypoint on a number of criteria or parameters to provide a general indication of whether it is reasonable to display such candidate waypoint in conjunction with the identified point of interest search result. In other words, a candidate waypoint that receives a higher score is more likely to be a useful item, location, or event to show alongside the search result.

As an example, the scoring formula used at (314) can provide a score to a candidate waypoint based at least in part on a distance between the candidate waypoint and the point of interest. Generally, a candidate waypoint is more likely to be a useful item or location to show alongside the search result if it reasonably close in distance from the identified point of interest search result. Therefore, a candidate waypoint can receive a higher score if it is closer to the point of interest and receive a lower score if it is farther in distance from the point of interest.

The distance between the candidate waypoint and the point of interest can equal a linear distance between the two locations, a driving, walking, or transit distance between the two locations according to a routing, or a duration of travel between the two locations according to one of a variety of travel methods.

As another example, the scoring formula used at (314) can provide a score to a candidate waypoint based at least in part on how likely the user is to want directions between the candidate waypoint and the point of interest search result. For example, if the point of interest is an airport, then the user is more likely to want directions between the airport and a candidate waypoint that represents a hotel. As another example, if the point of interest is a restaurant, then the user is less likely to want directions between the point of interest and a candidate waypoint that is another restaurant.

In some implementations, scoring each candidate waypoint at (314) can include determining a first distance scaling component, determining a second distance scaling component, and/or determining a suitability component. For example, the score provided at (314) can be the sum of such components.

The first distance scaling component can scale the distance between the candidate waypoint being scored and the point of interest based on a first category assigned to the candidate waypoint. As an example, the first distance scaling component can equal a first weighted distance divided by the distance between the candidate waypoint and the point of interest.

The first weighted distance can provide a number based on the first category assigned to the candidate waypoint being scored. In particular, the first weighted distance can parameterize how far a user is likely to travel to or from the candidate waypoint. Thus, if the first category assigned to the candidate waypoint is an airport category, then the first weighted distance may be relatively greater, such as 30 kilometers, 19 miles, or 20 minutes, as the user is likely to be willing or required to travel a larger distance to catch a flight. However, if the first category assigned to the candidate waypoint is a restaurant category, then the first weighted distance may be relatively less, such as 2 kilometers, 1.5 miles, or 5 minutes, as the user is likely to want to travel only a small distance to visit a restaurant. As further examples, a bus stop category may receive a 1 kilometer distance and a train station may receive a 10 kilometer distance.

Thus, the first weighted distance can provide an appropriate distance based on the first category assigned to the candidate waypoint being scored. Generally, the number provided by the first weighted distance can be in units that are homogenous to the expression of the distance between the candidate waypoint and the point of interest. The first weighted distance can be obtained from a table stored in memory that maps categorizations to distance values.

The second distance scaling component can scale the distance between the candidate waypoint being scored and the point of interest based on a second category assigned to the point of interest. As an example, the second distance scaling component can equal a second weighted distance divided by the distance between the candidate waypoint and the point of interest.

The second weighted distance can provide a number based on the second category associated with the point of interest. In particular, the second weighted distance can parameterize how far the user is likely to travel to or from the point of interest search result. Generally, the number provided by the second weighted distance can be in units that are homogenous to the expression of the distance between the candidate waypoint and the point of interest. The second weighted distance can be obtained from a table stored in memory that maps categorizations to distance values. Such values can be the same as or different from those provided for the first weighted distance.

The suitability component can provide a value indicative of a likelihood that the user desires directions between the location and the point of interest based on the first category assigned to candidate waypoint being scored and the second category assigned to the point of interest. For example, the suitability component can reference a look-up table that provides a suitability score for each potential combination of the first and second categories. As examples, the suitability component may provide a score of 1.5 for a combination of a hotel and an airport, a score of 0.5 for a combination of a restaurant and a restaurant, and a score of 1 for a combination of a hotel and a restaurant. The suitability component can also include a weighting coefficient.

In addition, other parameters can be included or analyzed by a suitable scoring formula. As an example, the current position of the client device can influence one or more components or aspects of the scoring formula. For example, if it is determined that the current location of the client device is a restaurant, then candidate waypoints that represent other restaurants can receive a lower score, as the user is less likely to want to visit consecutive restaurants.

As another example, in some implementations, a time can be associated with some or all of the candidate waypoints and the scoring formula can include a component that analyzes a difference between a current time and the time associated with the candidate waypoint being scored. For example, a candidate waypoint can receive a higher score if its associated time is imminent and can receive a lower score if its associated time is a significantly distant from the current time.

The scoring components discussed above can be considered in isolation or in other combinations and are not necessarily used at a single time to provide a single score. Scores provided by the above discussed components can be positive or negative in nature. Furthermore, weightings, coefficients, or other components of the scoring formula can be trained against data having a known accuracy or categorization to optimize the scoring formula.

After each of the candidate waypoints has been provided a score at (314), one or more of the candidate waypoints can be selected at (316) for presentation on a personalized map alongside the point of interest. For example, the two candidate waypoints that receive the highest scores can be selected at (316).

At (318) the host server can transmit mapping data to the client device and the client device can use such mapping data to present the personalized map to the user. The client device can present the personalized map on a display. The respective locations of the point of interest and the selected waypoints can be indicated using any suitable form of indicator. Textual information can be provided such as names, reviews, or keywords.

An estimated trip duration can be provided for one or more forms of transportation for each candidate waypoint. The user can be given the option of selecting and subsequently receiving directions to or from each presented waypoint and the point of interest. Alternatively, such directions can be overlaid on the map in a faded fashion.

The current location of client device can be displayed on the map and can influence the directionality of any offered directions between a waypoint and a point of interest search result. For example, the offered directions can generally provide navigation from the closer of the two locations to the more distant of the two locations from the perspective of the user.

In such fashion, when a user searches for a point of interest the resulting map can provide additional personalized waypoints that represent locations at which an event is expected to occur (e.g. a sporting event for which the user has purchased tickets) or locations that may be helpful for a user who is in an unfamiliar area (e.g. the location of the hotel at which she is staying or the airport from which she is departing).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A host server for providing geographic information comprising:
   one or more computing devices associated with the host server, the one or more computing devices being configured to perform operations comprising:
   receiving a search query from a client device, the client device having been associated with user account;
   in response to the received search query, identifying a point of interest for display on a map; and
   obtaining a plurality of candidate waypoints from a database, each of the candidate waypoints having been identified by analyzing data associated with the user account;
   determining a score for each of the candidate waypoints using a scoring formula, wherein the scoring formula includes scoring components that are based at least in part on a first category defining the type of entity of each candidate waypoint being scored and a second category defining the type of entity of the point of interest, and wherein the scoring formula includes a distance scaling component, the distance scaling component comprising a weighted distance divided by a distance between the candidate waypoint being scored and the point of interest, the weighted distance providing a number based on the second category associated with the point of interest; and
   selecting, based on the determined scores, at least one of the candidate waypoints for presentation on the map displaying the point of interest.

2. The host server of claim 1, wherein the client device is signed into the user account.

3. The host server of claim 1, wherein the data associated with the user account comprises email data.

4. The host server of claim 3, wherein the candidate waypoints are identified by comparing the email data to a plurality of templates.

5. The host server of claim 1, wherein the data associated with the user account comprises calendar entry data.

6. The host server of claim 1, wherein each of the candidate waypoints comprises a location at which an event is scheduled to occur.

7. The host server of claim 1, wherein the scoring formula provides the score for each candidate waypoint based at least in part on a distance between the candidate waypoint being scored and the point of interest.

8. The host server of claim 7, wherein the distance between the candidate waypoint being scored and the point of interest comprises a driving distance between the candidate waypoint being scored and the point of interest.

9. The host server of claim 1, wherein the scoring formula includes a suitability component, the suitability component providing a likelihood that directions between the candidate waypoint being scored and the point of interest are desired by a user.

10. The host server of claim 9, wherein the suitability component provides the likelihood by comparing the first category associated with the candidate waypoint being scored with the second category associated with the point of interest.

11. The host server of claim 1, wherein the scoring formula includes a distance scaling component, the distance scaling component comprising a weighted distance divided by a distance between the candidate waypoint being scored and the point of interest, the weighted distance providing a number based on the first category associated with the candidate waypoint being scored.

12. A computer-implemented method for providing a personalized map, the method comprising:
   receiving, by one or more computing devices, from a client device associated with a user account, a request for geographic information;
   identifying, by the one or more computing devices, based on the request for geographic information, a point of interest;
   obtaining, by the one or more computing devices, from a database a plurality of candidate reference locations associated with the user account, wherein the plurality of candidate reference locations are culled from user data comprising email data or calendar data;
   assigning, by the one or more computing devices, each of the plurality of candidate reference locations to one of a plurality of first categories;
   assigning, by the one or more computing devices, the point of interest to one of a plurality of second categories;
   determining, by the one or more computing devices, a score for each of the plurality of candidate reference locations using a scoring formula, the scoring formula receiving the point of interest as an input and including scoring components that are based at least in part on a first category defining the type of entity of each candidate reference location being scored and a second category defining the type of entity of the point of interest, wherein the scoring formula further includes a suitability component that references a look-up table providing a suitability score for each combination of the first and second categories; and
   selecting, by the one or more computing devices, based on the determined scores, at least one of the plurality of candidate reference locations for presentation on the personalized map.

13. A computing system for providing personalized maps, the computing system being configured to perform operations comprising:
   analyzing data associated with a user account to identify a plurality of locations the user is expecting to visit;
   storing the plurality of locations in a database;
   identifying a point of interest in response to a search request received from the user;
   determining, for each of the plurality of locations, a score based at least in part on a distance between the location and the point of interest and a likelihood that the user desires directions between the location and the point of interest, the likelihood based at least in part on a first category defining the type of entity of each location being scored and a second category defining the type of entity of the point of interest;
   wherein determining, for each of the plurality of locations, a score based at least in part on a distance between the location and the point of interest and a likelihood that the user desires directions between the location and the point of interest comprises, for each of the plurality of locations:
   determining a first distance scaling component;
   determining a second distance scaling component; and
   determining a suitability component; and
   selecting, based on the plurality of scores, one or more of the plurality of locations for presentation on a map alongside the point of interest.

14. The computing system of claim 13, wherein analyzing data associated with a user account to identify a plurality of locations the user is expecting to visit comprises:
   parsing textual information to identify a plurality of scheduled events; and
   respectively generating a plurality of geocodes for the plurality of scheduled events, the plurality of locations comprising the plurality of geocodes.

15. The computing system of claim 13, wherein:
   the first distance scaling component scales the distance between the location and the point of interest based on the first category assigned to the location;
   the second distance scaling component scales the distance between the location and the point of interest based on the second category assigned to the point of interest; and
   the suitability component provides the likelihood that the user desires directions between the location and the point of interest based on the first category and the second category.

16. The computing system of claim 15, wherein determining, for each of the plurality of locations, a score based at least in part on a distance between the location and the point of interest and a likelihood that the user desires directions between the location and the point of interest further comprises, for each of the plurality of locations, summing the first distance scaling component, the second distance scaling component, and the suitability component.

* * * * *